Figure 1:
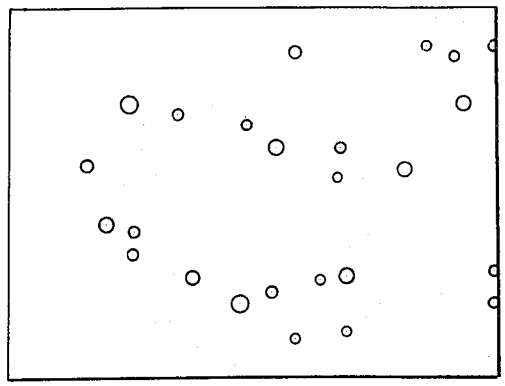

July 25, 1961 W. L. DEAN ET AL 2,993,797
CHEMICAL ADDITIVE FOR USE IN THE PRODUCTION
OF CELLULOSE PRODUCTS
Filed Feb. 26, 1960

INVENTORS
Walter L. Dean
Arthur M. Dowell, Jr.
BY
Watson, Cole, Grindle
& Watson ATTORNEYS _United States Patent Office_

2,993,797
Patented July 25, 1961

2,993,797
CHEMICAL ADDITIVE FOR USE IN THE PRODUCTION OF CELLULOSE PRODUCTS
Walter L. Dean and Arthur M. Dowell, Jr., Memphis, Tenn., assignors to The Buckeye Cellulose Corporation, Cincinnati, Ohio, a corporation of Ohio
Filed Feb. 26, 1960, Ser. No. 11,282
10 Claims. (Cl. 106—163)

This invention relates to new and useful improvements in the manufacture of refined chemical wood pulp which is to be converted into viscose rayon, cellulose acetate fibers, cellulose films and similar products. More particularly, this invention relates to the discovery of a single chemical additive which, when incorporated into prehydrolyzed sulphate chemical wood pulp and/or in the diverse processing operations whereby such cellulose pulp is converted into useful fibers, films and shaped articles of chemically modified or regenerated cellulose, contributes a unique combination of desirable attributes to the processing and products thereof without adversely affecting or interfering in any manner with the intrinsic characteristics of the prehydrolyzed sulphate chemical wood pulp, the processing thereof, or the derived products.

Specifically this invention relates to the discovery of a chemical additive for use in prehydrolyzed sulphate chemical wood pulp, and the processing thereof in the viscose process to obtain various benefits, for example, in the handling and application of the additive, in the dispersion of delustering oils and pigments in the viscose, in the compatibility of the additive with regenerating baths as employed in the production of fibers and films from viscose, and in materially improving viscose filtration in both the conventional and slurry viscose processes.

It is, therefore, an object of this invention to provide a chemical additive which is advantageous in having the combination of ease of application to pulp and viscose processes by reason of its ability to form high percentage aqueous solutions of low viscosity at ambient temperatures, in promoting the dispersion of oils and/or pigments (delustering agents) in viscose, in having no adverse effects in the viscose process in regard to spinneret incrustation, yarn color, dye index, and yarn mechanical properties, in being compatible with spin or casting bath components and casting bath sludge, and which in addition materially improves viscose filtration in both the conventional and slurry viscose processes.

It is also an object of this invention to provide a prehydrolyzed sulphate chemical wood pulp chemical additive which has outstanding utility in the manufacture of regenerated cellulose products.

It is a further object of this invention to obtain beneficial effects in the processing of prehydrolyzed sulphate chemical wood pulp and the viscose and fibers prepared therefrom, by the addition of the chemical additive to prehydrolyzed sulphate chemical wood pulp at any one of the following points in processing; prior to drying said pulp, on the dried pulp, in the viscose process prior to the completion of the xanthation operation, or in the viscose itself prior to spinning.

It is a still further object of this invention to provide a chemical additive for use in prehydrolyzed sulphate chemical wood pulp and the processing thereof into regenerated fibers and films by the viscose process which has a negligible solubility in steeping caustic and a substantial solubility in dissolving caustic.

Figure 2:
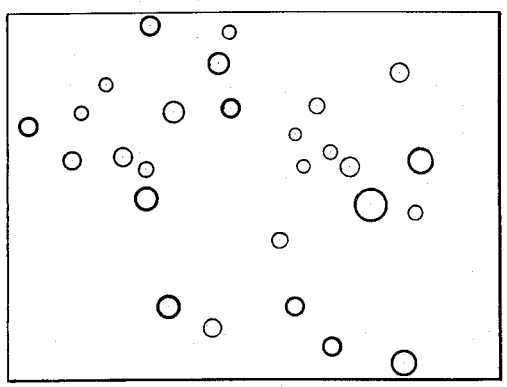
Figure 3:
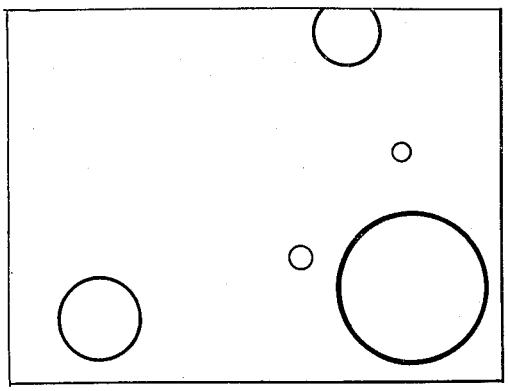

Further objects and advantageous features will appear from the following detailed description taken in connection with the accompanying drawings, in which FIGURE 1 is a photomicrograph of viscose with which is incorporated a small amount of the chemical additive used in the practice of the invention; FIGURE 2 is a similar photomicrograph in which another chemical additive is employed, and FIGURE 3 is a similar photomicrograph of viscose without chemical additive.

A great number of chemical additives have been proposed for use in the various processes and operations involved in the transformation of ligno-cellulosic raw materials into refined chemical pulp and, from this intermediate state, into fibers and films of the general types heretofore mentioned. Chemical additives of the non-ionic, anionic, and cationic classes have been used for such diverse benefits as deresination and wetting in pulp production and have been incorporated into pulp or utilized in the regeneration processes to accomplish filtration improvement, fiber modification, tensile and fatigue strength improvement, spinneret incrustation inhibition and the like. After the initial discoveries that the addition to pulp and viscose of certain chemical agents such as spirits of turpentine disclosed in United States patent to Charles N. Waite, No. 689,336, granted December 17, 1901, and oleic acid, disclosed in United States patent to Nahum E. Katz, No. 1,251,237, granted December 25, 1917, would improve the viscose processing of cellulose, there followed in rapid succession discoveries relating to other aspects of pulp and regenerated cellulose fiber and film production, but these discoveries were each directed to a specific benefit to be obtained by the use of a specific chemical agent at a certain point in the lengthy list of unit processes which separate raw wood or other cellulosic raw materials from finished regenerated cellulose fibers, yarns, cloths, films and articles for the consumer, or industrial, market. Therefore, a catalogue of agents, conditions and results has been developed in the art whereby a manufacturer might conceivably choose several desirable results for a finished product and incorporate several agents to obtain these effects in the manner of a pharmacist compounding a prescription. Unfortunately, this approach is not generally possible. For instance, surface active agents contributing desirable individual results, such as anionic and cationic surfactants, are not mutaully compatible and therefore cannot be used in combination. Therefore, it is found that subtleties in the nature of surfactants in the presence of the chemical systems of pulp and fiber production make many otherwise desirable combinations impossible. It is therefore desirable, for this reason, as well as those of economy and control to seek single chemical agents having desirable combinations of properties.

It has been discovered that one such agent having a multiplicity of desirable features is disodium 4-chloro-4'-dodecyl-diphenyl oxide disulfonate having the structure

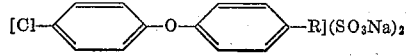

wherein R represents the dodecyl radical, tetra-polypropylene. The additive can be employed in substantially pure form or as a mixture in which R represents polypropylene radicals having 9 to 15 carbon atoms and consists predominantly of radicals having 12 carbon atoms. Moreover, mixtures of such 4-chloro compounds containing up to about 15 percent of the 2-chloro isomers can be employed.

Aqueous solutions of the additive of this invention are low in viscosity at ambient temperatures, and concentrated solutions can be readily and advantageously applied to the prehydrolyzed sulphate chemical wood pulp in amounts of up to 0.5% based on the weight of the bone dry pulp. The chemical additive of this invention also has no adverse effects in the viscose process in regard to spinneret incrustation, yarn color, dye index, and yarn mechanical properties. Moreover, it is compatible with spin or casting bath components and casting bath sludge. Furthermore, it promotes the dispersion of oils and/or pigments in viscose, and in addition improves viscose filtration in both the conventional and slurry viscose processes.

In the prehydrolysis operation, wood chips or other lignin-containing cellulosic materials are conventionally treated with water, steam or dilute acid solution (up to about 0.3% solution of acid), at from about 300° to about 375° F., and at pressures greater than atmospheric, for reaction times up to about 120 minutes. This treatment is carried out under acid conditions which are preferably induced by the addition of an acid such as, for example, acetic, citric, nitric, oxalic, phosphoric, sulfurous (sulfur dioxide), sulfuric or combinations of these. Alternatively, if it is desired that no acid shall be used, and provided no alkaline agents have been added, an acid condition will develop as a result of the hydrolysis of the cellulosic raw material being heated. At the end of this treatment, the hydrolysis liquid is drained off, and the remaining solid material may be washed in situ, or the cooking liquor for the next step may be added directly without washing.

The hydrolyzed lignin-containing material is then pulped by the "sulphate process" wherein the active digesting ingredients are sodium hydroxide and sodium sulfide. This process is well known to those skilled in the art and any reference to the "sulphate" method of digestion appearing herein or in the appended claims refers to digestion wherein the active digesting ingredients are sodium hydroxide and sodium sulfide.

The digested pulp is bleached and purified by a series of treatments with chlorine, sodium hypochlorite, caustic, chlorine dioxide and the like prior to wet-lapping, sheet forming or bulk drying. When chemical additives are incorporated into pulp to achieve subsequent processing advantages, they may be introduced into pulp slurries prior to final formation. For reasons of economy, however, it is preferred to incorporate the additive into bulk or sheet pulp by appropriate spraying, brushing or coating techniques during and subsequent to the drying of the pulp.

As is well known in the art, in the production of viscose by the conventional sheet steeping method, dried cellulose sheets are placed in a steeping press and soaked in a strong aqueous solution of caustic soda which contains approximately 18.5% sodium hydroxide by weight. The chemical additive of this invention has a solubility of less than 0.1 gram per 100 milliliters of this caustic solution and is not removed from the pulp to any appreciable extent during steeping. The caustic soda solution is normally introduced from the bottom of the enclosure at such a rate that it rises along the sheets in the direction of the predominant lengthwise orientation of the pulp fibers at a rate equal to that induced by the capillarity of the pulp. The operation is generally conducted at room temperature. After about one hour immersion, the pulp is pressed to obtain the desired alkali cellulose composition and then reduced to crumbs in a shredder. This latter mechanical action proceeds from about one to about two hours.

The continuous or slurry process of steeping differs from the conventional process in that the pulp, containing the chemical additive if desired, is fed into a tank of concentrated caustic soda solution at a uniform rate. There it is reduced to a slurry of fibers by mechanical and hydraulic means. This step is usually conducted at temperatures of about 40° C., but temperatures up to 65° C. are used, with the higher temperatures being preferred because of the accelerated rate of alkali cellulose production obtainable at the higher temperatures. After an average treatment of about 15 minutes, the slurry of fibers is forced by pressure between rotating rolls which are slotted or otherwise perforated to permit drainage of the caustic. The pressed cake of alkali cellulose is then reduced to crumbs, generally on one of the two types of machinery conventionally employed by the art, i.e., a "one-pass" Garnett roll type shredder or a disc refiner type shredder.

Continuous shredding permits substantially instantaneous shredding of alkali cellulose by one passage of the alkali cellulose through a stator-rotor, or a double rotor, arrangement of the shredder which may be either of disc or roll design. The "Sprout-Waldron" refiner is an example of the disc type shredder as compared to the Garnett roll type shredder. The disc refiner normally subjects alkali cellulose to much less severe mechanical action than is the case with a high speed roll type shredder.

Beginning with the alkali cellulose crumbs, the two processes are substantially the same through the regeneration step. The alkali cellulose crumbs are aged under conventional carefully controlled conditions. Here, by means of alkaline oxidation, the average molecular chain length of the cellulose is reduced so that the material will have a lower solution viscosity. After aging, the alkali cellulose crumbs are mechanically mixed with the proper proportion of $CS_2$, which combines chemically to form cellulose xanthate. Upon addition of dilute aqueous caustic soda solution (approximately 7% sodium hydroxide by weight) in a mixing device, the orange colored cellulose xanthate crumbs dissolve and form a syrupy solution which is known as "viscose." The chemical additive of this invention has a solubility of more than 20 grams per 100 milliliters of such caustic solution and, if present at this stage of processing, is dissolved in the viscose to yield its advantages in later processing steps. The viscose is then ripened at conventional controlled temperatures. In this ripening step, complex chemical and colloidal changes occur so that the cellulose xanthate is more easily regenerated to cellulose in spinning. Regeneration into filaments or films consists of extruding a viscose solution through the minute holes of a spinneret, or through slits, into a bath containing acid and salts. The dissolved cellulose compound in the viscose solution reacts with the acid solutions to coagulate and regenerate cellulose which precipitates and forms continuous solid filaments or films. The salts in the bath help to control the precipitation of the cellulose and to modify the properties of the product. Sludge of the impurities introduced by the viscose gradually forms in the regenerating bath. The combined filaments from single spinnerets make up the yarn which is washed, treated chemically to remove residual sulphur, washed again and dried. The filaments are twisted at this time to give the yarn strength and unity. In film manufacture, the steps of washing, sulphur removal, washing and drying are also practiced.

The chemical additives of this invention are employed in amounts of about 0.01% to about 0.5% based on the bone dry weight of the cellulose at the point of addition.

In the preferred mode of practicing the invention, 0.1% of the chemical additive is applied to the dried sheet cellulose prior to steeping, and is thereby available to effect materially improved viscose filtration and dispersion of oils or pigments, without adverse effects in regard to spinneret incrustation, yarn color, dye index, and yarn mechanical properties, and compatibility with spin or casting bath components and sludge.

In the following examples there are illustrated preferred embodiments of this invention, but it is understood that the examples are not to be construed as limiting the scope of the invention.

EXAMPLE I

Disodium 4-chloro-4'-dodecyl-diphenyl oxide disulfonate (containing 15% of the 2-chloro isomer) is incorporated into sheeted pulp prepared by the prehydrolysis sulphate process by spraying the surface of the pulp sheet with an amount of aqueous solution containing 25% by weight of the above mentioned chemical additive sufficient to provide 0.1% by weight of the chemical additive based on the bone dry weight of the pulp.

It will be understood that the method of incorporating the chemical of this invention is not critical. It can be introduced into a pulp slurry prior to bulk drying or sheet formation and can be introduced into a pulp sheet by any of the other known methods, such as by striping, brushing, and rolling.

Table I below tabulates the physical characteristics of the 25% aqueous solution of the present chemical additive used in Example I above in comparison with another pulp additive.

Table I

| Additive | Solution Concentration (percent by wt.) | Density (g./ml.), 25° C. | Surface Tension, dynes/cm., 25° C. | Brookfield Viscosity (centipoises) | |
|---|---|---|---|---|---|
| | | | | 25° C. | 40° C. |
| Disodium 4-chloro-4'-dodecyl-diphenyl oxide disulphonate (containing about 15% of the 2-chloro isomer) | 25 | 1.085 | 30.5 | 7.1 | 8.1 |
| Highly sulphonated castor oil (Monosulf I) | 25 | 1.013 | 32.9 | 26.2 | 10.1 |

These results illustrate the suitability of the chemical additive of this invention for application as regards the desirable attribute of low viscosity in high strength solutions which can be easily applied to pulp, or to the intermediate materials in viscose processing without the addition of excessive water. The data clearly illustrates that no heating of solutions of practical strength is necessary to lower viscosities for ease in application with the present additive as is the case with the comparative material.

EXAMPLE II

A pulp sample is prepared by cutting 300 grams of sheeted prehydrolyzed sulphate chemical wood pulp containing no chemical additive into 2 inch square pieces. The pulp is then added piece by piece to 6080 ml. of aqueous 17.2% sodium hydroxide solution at 40° C. while stirring to insure individual wetting of the pulp squares. After the last square of pulp is added stirring is continued for fifteen minutes, after which time the alkali cellulose slurry is poured into a metal cylinder having a stainless steel bottom and a drain plug. A solid iron ram is placed in the cylinder so that the cake is pressed to 2.8 times the bone dry weight of the original pulp. The cake is broken into pieces and placed in a motor-driven stainless steel shredder for one hour and forty-five minutes while being maintained at 35° C. by jacket water circulation on the shredder. Four portions (for convenience in handling) of 175 grams each of the shredded alkali cellulose thus produced are placed in as many one-half gallon glass-topped fruit jars for 24 hours aging at 29° C.

After aging, the contents of two of the glass jars of alkali cellulose are transferred to each of two stainless steel churns. To each 350 gram sample is added 0.1% (based on the bone dry weight of the cellulose) of a commercial preparation of disodium 4-chloro-4'-dodecyl-diphenyl oxide disulfonate (containing about 15% of the 2-chloro isomer) in the form of a 25% by weight aqueous solution. Carbon disulfide is then added in an amount sufficient to provide an amount of carbon disulfide equal to 30% of the weight of the bone dry cellulose in each of the churns. The churns are then sealed and placed on a machine to roll and tumble the contents for 75 minutes at 30° C.

The cellulose xanthate thus prepared in two identical samples is transferred to each of two stainless steel, two liter, beakers containing a solution of sodium hydroxide in amount and strength to yield viscoses containing 5.5% sodium hydroxide and 9% cellulose. The viscoses are then stirred for two hours at 15°–18° C.

The viscoses thus prepared are warmed to 25° C. and tested for filtration value by placing them individually (for duplicate values) in each of two steel cylinders, sealing the cylinders and applying air pressure at 60 p.s.i.g. to force the viscose thru a filter cloth area of 0.25 square inch at the lower end of the cylinder. The viscose forced thru the filter is collected in a tared beaker and the time in seconds required for each 100 grams of filtrate to collect is noted. The time of final clog of the filter is taken when there is a five second interval between consecutive drops of filtrate issuing from the filter. Calculations are made as follows:

(1) Percent clogging at 700 grams
$$= \left(1 - \frac{\text{1st 100 g. increment time}}{\text{7th 100 g. increment time}}\right)$$

(2) Filtration value $= \dfrac{70,000}{\text{Percent clog at 700 grams}}$

The effect of various agents which are added uniformly to the pulp in 0.1% quantities, based on the bone dry weight of the cellulose in the manner of Example II is expressed in the following rating table in terms of the aforementioned calculation of filtration value.

FILTRATION RATING

| Trade Name | Filtration Value | Surfactant Type |
|---|---|---|
| Chemical additive of the invention | 1,104 | Disodium 4-chloro-4'-dodecyl diphenyl oxide disulfonate containing about 15% of the 2-chloro derivative. |
| Petro AA | 570 | Alkyl napthalene sulfonate. |
| Santomerse E | 240 | Alkyl benzene sulfonate with short alkyl chain (up to nine carbon). |
| Monosulf I | 961 | Highly sulfonated castor oil. |
| Blank | 282 | No additive. |

EXAMPLE III

Sufficient sheeted prehydrolyzed sulphate chemical wood pulp is cut to 9 inch by 9 inch sheet size to make a sample weighing approximately 450 grams. The sheets are placed in a steeping press of the proper size to fit the sized sheets with the machine direction of the sheets perpendicular to the bottom of the press. The steeping press is then filled with an aqueous caustic solution containing 18.5% sodium hydroxide by weight until the top of the sheets are one-half inch beneath the caustic level. The filling rate approximated the rise of the caustic solution in the pulp sheets by capillary attraction.

After 50 minutes the caustic is drained from the press and the steeped pulp is pressed to a weight of 2.9 times its original weight. The pressed alkali cellulose is then shredded for one hour at 29° C. At the completion of shredding 240 gr. portions of the alkali cellulose are weighed out, placed in one-half gallon glass jars and sealed for aging at 29° C. for a period of 21 hours.

At the end of the aging period, 22 ml. of carbon disulfide is added to each of the glass jars and the then sealed jars are rolled for 2 hours at 25° C.

An amount of aqueous caustic solution necessary to result in viscose containing 7% cellulose and 6% sodium hydroxide is added to convert the cellulose xanthate thus produced to viscose.

Three 1140 gram samples of viscose are prepared by the method of this Example III.

A 6.25 gram portion of an oil delusterant prepared by mixing equal weight portions of pine oil and mineral oil is added to each of the three 1140 gram portions of viscose. To one portion, designated as Sample 1, is also added 0.1% (based on the cellulose) of disodium 4-chloro-4'-dodecyl-diphenyl oxide disulfonate containing about 15% of the 2-chloro isomer. To another portion, designated as Sample 2, is added 0.1% of Monosulf I. No additive is combined with the third portion, designated as Sample 3. All three of the samples are mixed for 2 hours at 25° C. with a stirrer revolving at 2300 r.p.m.

At the end of this time the stirred viscoses are stored for 24 hours and then examined microscopically to determine the condition of the oil particles within the viscose.

The examination is accomplished by placing a small droplet of viscose on a glass slide and covering the droplet with a cover glass (22 x 22 mm.) to spread the droplet. An American Optical Company phase microscope equipped with a B minus (low contrast) 16 mm. objective and a 10× eyepiece is used to take photomicrographs resulting in a 100× magnification on the prints made to record the observations.

These recorded observations are represented by FIGURES 1, 2 and 3 of the drawing in which the viscose of FIGURE 3 contained no surfactant, the viscose of FIGURE 2 contained 0.1% of Monosulf I and the viscose of FIGURE 1 contained 0.1% disodium 4-chloro-4'-dodecyl-diphenyl oxide disulfonate mixture.

It is obvious from the drawings that the disodium 4-chloro-4'-dodecyl-diphenyl oxide disulfonate mixture is effective in dispersing and maintaining the dispersement of the oil delusterant droplets so that the maximum volume of the particles is approximately one-eighth of that obtained with the viscose containing the Monosulf I. The improved dispersement of oil delusterants and/or pigments in viscoses is a highly important feature resulting in improved delustering and/or pigmentation together with improved fiber strength in fibers spun from the viscoses.

EXAMPLE IV

Again two viscoses prepared by the general method of Example III and differing only that in one sample no surfactant is added while in the other 0.1% of disodium 4-chloro-4'-dodecyl-diphenyl oxide disulfonate is added during the shredding of the alkali cellulose, are spun (8 spins) and tested for physical properties with the results shown in the following table.

*Table II*

| Additive | Denier | Conditioned Fiber Properties | | | | | |
|---|---|---|---|---|---|---|---|
| | | Dry | | | Wet | | |
| | | Ten., g./den. | Elong., Percent | Silk Factor | Ten., g./den. | Elong., Percent | Silk Factor |
| None | 151.8 | 2.06 | 17.6 | 36.1 | 0.99 | 39.0 | 38.6 |
| 0.1% disodium 4-chloro-4'-dodecyl-diphenyl oxide disulfonate (containing 15% of the 2-chloro isomer) | 150.4 | 2.08 | 17.4 | 36.1 | 1.00 | 39.1 | 39.1 |

These results show that the presence of the chemical additive of this invention in the viscose results in no decrease in the fiber strength and no significant change in other desirable mechanical properties of fibers spun from the viscose.

In addition to these desirable attributes it is noted that the presence of disodium 4-chloro-4'-dodecyl diphenyl oxide disulfonate mixture did not result in any increased incrustation (cratering) of the spinnerets thru which viscose was spun and does not affect the dyeing of yarns.

EXAMPLE V

Knitted tubular samples, known in the trade as "hose," wherein the yarn used is spun from vicose prepared in the manner of Example III, are prepared so that the yarn used for one-half of the sample is derived from viscose containing no additive and the yarn used for the other half is prepared from viscose containing 0.1% of disodium 4-chloro-4'-dodecyl-diphenyl oxide disulfonate (containing 15% of the 2-chloro isomer) based on the cellulose weight.

These "hose" samples are subjected to a "boil-off" cleansing procedure consisting of (1) weighing the knitted fabric "hose" and washing it with cold water and, (2) introducing the knitted fabric "hose" into a boil-off solution, boiling it for fifteen minutes and thereafter washing the sample thoroughly with water. The boil-off solution is prepared according to the following formula:

BOIL-OFF SOLUTION

A weight of $H_2O$ to equal weight of fabric×40
A weight of 10% aqueous solution of sulfonated castor oil to equal 0.5% the weight of fabric
A weight of 5.0% aqueous Castile soap solution to equal the weight of the fabric
A weight of 5.0% aqueous pyrophosphate solution to equal 1.0% of the weight of the fabric The treated "hose" samples are then subjected to a dyeing procedure consisting of placing a dyeing solution (consisting of water equivalent to 40 times the weight of the fabric and an amount of 1.0% Pontamine Sky Blue 6BX solution equivalent to 1.0% of the weight of the fabric) in a stainless steel beaker together with the "hose" sample and heating it to 60° C., whereupon an amount of 10% aqueous solution of sodium sulfate equivalent in weight to 10% of the weight of the fabric is added and the solution is heated rapidly to boiling within 5 minutes. Upon reaching the boiling point, the fabric sample is removed from the beaker, rinsed thoroughly with water, and hung up to dry without wringing. The Pontamine Sky Blue 6BX solution used in this dyeing procedure is prepared by dissolving 10 grams of the Pontamine Sky Blue 6BX dye in water sufficient to make up 1 liter of solution.

After drying, the "hose" samples are examined visually and no detection of color difference can be made between the end of the samples prepared from yarn spun from viscose containing disodium 4-chloro-4'-dodecyl-diphenyl oxide disulfonate and the end prepared from yarn spun from viscose containing no additive.

EXAMPLE VI

In the use of chemical additives in processing of prehydrolyzed sulphate chemical wood pulp, it is important that the chemical agent utilized be compatible with the casting bath solutions used in the casting process.

A supply of casting bath solution (containing approximately 12.2% $H_2SO_4$, 18% $Na_2SO_4$ and the sludge inherent in used casting bath solution) which has been used in cellulose regeneration operations is agitated thoroughly to distribute the sludge, and a 25 ml. sample is poured into each of three 50 ml. glass-stoppered graduated cylinders. 150 p.p.m. of disodium 4-chloro-4'-dedecyl-diphenyl oxide disulfonate (containing 15% of the 2-chloro isomer) is added to the first of the cylinders as a 10% aqueous solution, and 150 p.p.m. of Monosulf I is added to the second cylinder. No chemical agent is added to the third cylinder so that it serves as a control blank.

The cylinders are then shaken vigorously and observed before an illuminated milk-glass plate. The time elapsed (to the nearest five minutes) before the sludge in either of the samples containing a chemical additive is observed to be agglomerated more than that in the control sample is noted. If the sludge in a sample settles no faster than the sludge in the control sample for a period of sixty minutes, it is rated as compatible.

The following table shows the results of the test of this example:

Table III
COMPATIBILITY OF ADDITIVE WITH SLUDGE IN CASTING BATHS

| Additive | Agglomeration Time |
| --- | --- |
| Disodium 4-chloro-4'-dodecyl diphenyl oxide disulfonate (containing 15% of the 2-chloro isomer). | 60 min.+. |
| Monosulf I | 10 min.— (scum formation). |
| Blank | 60 min. |

The data show that the presence of the chemical additive of this invention in casting bath solutions, as would occur in casting viscoses where it is present, has no adverse effect on the sludging characteristics of regenerating bath solutions as does the other chemical additive tested.

Instead of the chemical additive used in the above examples, a substantially pure disodium 4-chloro-4'-tetrapolypropylene diphenyl oxide disulfonate or a mixture thereof with minor amounts of the corresponding tripolypropylene and pentapolypropylene radicals can be used with substantially equal result.

We claim:
1. A prehydrolyzed sulphate chemical wood pulp of improved charactertistics for viscose rayon manufacture, having incorporated therein, based on the bone dry weight of the pulp, from about 0.01% to about 0.5% of a chemical additive of the formula:

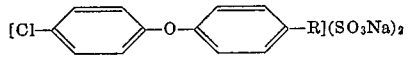

wherein R represents a polypropylene radical having 9 to 15 carbon atoms and is predominantly the C–12 radical, said chemical additive being characterized by (1) high solubility in water to form aqueous solutions of low viscosity which are readily incorporated in said pulp, (2) solubility in steeping caustic below about 0.1 gram per 100 milliliters of steeping caustic, (3) solubility in dissolving caustic above about 20 grams per 100 milliliters of dissolving caustic, (4) regenerating bath compatability and (5) delustrant dispersion effectiveness, without adverse effect on yarn color, dye index, textile yarn properties and spinneret incrustation.

2. A prehydrolyzed sulphate chemical wood pulp of improved characteristics for viscose rayon manufacture, having incorporated therein, based on the bone dry weight of said pulp, from about 0.01% to about 0.5% of a chemical additive of the formula:

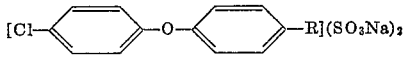

wherein R represent the dodecyl radical, tetra-polypropylene, said chemical additive being characterized by (1) high solubility in water to form aqueous solutions of low viscosity which are readily incorporated in said pulp, (2) solubility in steeping caustic below about 0.1 gram per 100 milliliters of steeping caustic, (3) solubility in dissolving caustic above about 20 grams per 100 milliliters of dissolving caustic, (4) regenerating bath compatability and (5) delustrant dispersion effectiveness, without adverse effect on yarn color, dye index, textile yarn properties and spinneret incrustation.

3. A prehydrolyzed sulphate chemical wood pulp of improved characteristics for viscose rayon manufacture, having incorporated therein, based on the bone dry weight of said pulp, from about 0.01% to about 0.5%, of a chemical additive comprised of about 85% of a chemical additive of the formula:

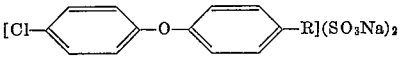

as the active ingredient, wherein R represents a polypropylene radical having 9 to 15 carbon atoms and is predominantly the C–12 radical, and about 15% of the 2-chloro isomer of said active ingredient, said chemical additive being characterized by (1) high solubility in water to form aqueous solutions of low viscosity which are readily incorporated in said pulp, (2) solubility in steeping caustic below about 0.1 gram per 100 milliliters of steeping caustic, (3) solubility in dissolving caustic above about 20 grams per 100 milliliters of dissolving caustic, (4) regenerating bath compatability and (5) delustrant dispersion effectiveness, without adverse effect on yarn color, dye index, textile yarn properties and spinneret incrustation.

4. A prehydrolyzed sulphate chemical wood pulp as described in claim 1 wherein the amount of the chemical additive incorporated is about 0.1%.

5. In the manufacture of regenerated cellulose products from prehydrolyzed sulphate chemical wood pulp by the vicose process, the step of incorporating in the processing, at a stage prior to the regeneration of the cellulose, from about 0.01% to about 0.5%, based on the bone dry weight of said cellulose, of a chemical additive of the formula:

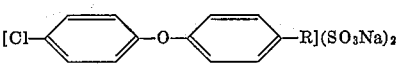

wherein R represent a polypropylene radical having 9 to 15 carbon atoms and is predominantly the C–12 radical, said chemical additive being characterized by (1) high solubility in water to form aqueous solutions of low viscosity which are readily incorporated in the processing, (2) solubility in steeping caustic below about 0.1 gram per 100 milliliters of steeping caustic, (3) solubility in dissolving caustic above about 20 grams per 100 milliliters of dissolving caustic, (4) regenerating bath compatability and (5) delustrant dispersion effectiveness, without adverse effect on yarn color, dye index, textile yarn properties and spinneret incrustation.

6. In the manufacture of regenerated cellulose products from prehydrolyzed sulphate chemical wood pulp by the viscose process, the step of incorporating in the processing, at a stage prior to the completion of xanthation, from about 0.01% to about 0.5%, based on the bone dry weight of said pulp, of a chemical additive of the formula:

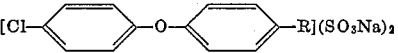

wherein R represents a polypropylene radical having 9 to 15 carbon atoms and is predominantly the C–12 radical, said chemical additive being characterized by (1) high solubility in water to form aqueous solutions of low viscosity which are readily incorporated in the processing, (2) solubility in steeping caustic below about 0.1 gram per 100 milliliters of steeping caustic, (3) solubility in dissolving caustic above about 20 grams per 100 milliliters of dissolving caustic, (4) regenerating bath compatability and (5) delustrant dispersion effectiveness, without adverse effect on yarn color, dye index, textile yarn properties and spinneret incrustation.

7. The manufacture of regenerated cellulose products as described in claim 5 wherein the amount of chemical additive incorporated is about 0.1%.

8. The manufacture of regenerated cellulose products as described in claim 6, wherein the amount of chemical additive incorporated is about 0.1%.

9. In the manufacture of regenerated cellulose products from prehydrolyzed sulphate chemical wood pulp by the viscose process, the step of incorporating in the processing, at a stage prior to the regeneration of the cellulose, about 0.1%, based on the bone dry weight of said cellulose, of a chemical additive comprised of about 85% of a chemical additive of the formula:

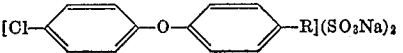

as the active ingredient, wherein R represent a polypropylene radical having 9 to 15 carbon atoms and is predominantly the C–12 radical, and about 15% of the 2-chloro isomer of said active ingredient, said chemical additive being characterized by (1) high solubility in water to form aqueous solutions of low viscosity which are readily incorporated in the processing, (2) solubility in steeping caustic below about 0.1 gram per 100 milliliters of steeping caustic, (3) solubility in dissolving caustic above about 20 grams per 100 milliliters of dissolving caustic, (4) regenerating bath compatibility and (5) delustrant dispersion effectiveness, without adverse effect on yarn color, dye index, textile yarn properties and spinneret incrustation.

10. In the manufacture of regenerated cellulose products from prehydrolyzed sulphate chemical wood pulp by the viscose process, the step of incorporating in the processing, at a stage prior to the completion of xanthation, about 0.1% based on the bone dry weight of said cellulose, of a chemical additive comprised of about 85% of a chemical additive of the formula:

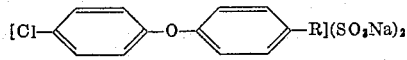

as the active ingredient, wherein R represent a polypropylene radical having 9 to 15 carbon atoms and is predominantly the C–12 radical, and about 15% of the 2-chloro isomer of said active ingredient, said chemical additive being characterized by (1) high solubility in water to form aqueous solutions of low viscosity which are readily incorporated in the processing, (2) solubility in steeping caustic below about 0.1 gram per 100 milliliters of steeping caustic, (3) solubility in dissolving caustic above about 20 grams per 100 milliliters of dissolving caustic, (4) regenerating bath compatability and (5) delustrant dispersion effectiveness, without adverse effect on yarn color, dye index, textile yarn properties and spinneret incrustation.

References Cited in the file of this patent

UNITED STATES PATENTS

| Re. 24,486 | Mitchell | June 10, 1958 |
| 2,792,313 | Charles et al. | May 14, 1957 |
| 2,931,734 | Durso | Apr. 5, 1960 |

OTHER REFERENCES

Elod et al.: Reyon Zellwolle und Andere Chemiefasern, vol. Jahrg., 1955, No. 33, pages 321–323.